Aug. 2, 1927.
W. STOECKICHT
CHANGE SPEED FRICTION GEARING
Filed April 28, 1924
1,637,664
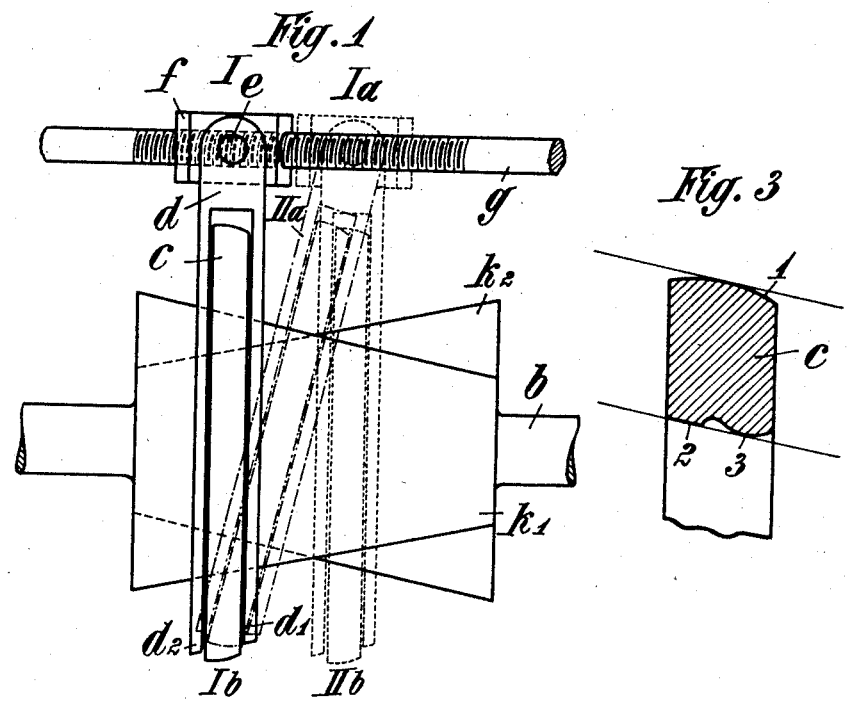
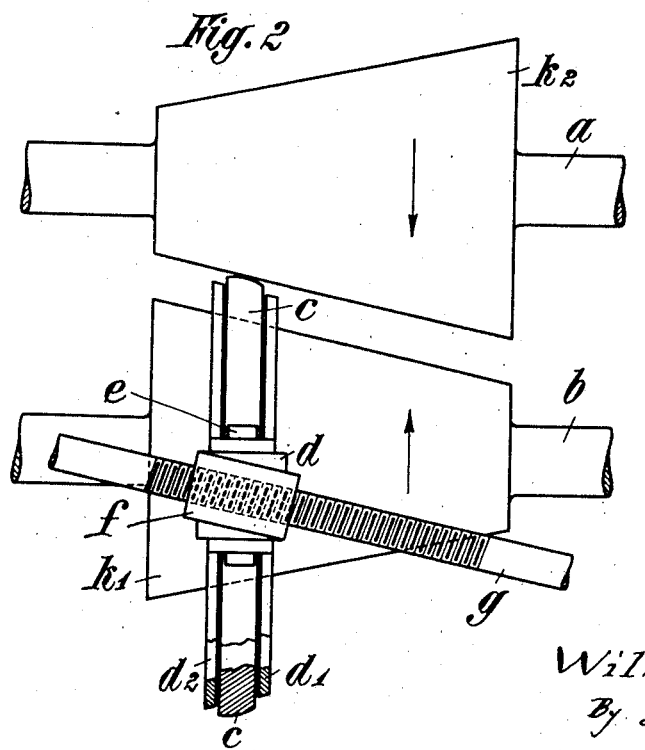
Inventor:
Wilhelm Stoeckicht
By
Attorney Patented Aug. 2, 1927.

1,637,664

UNITED STATES PATENT OFFICE.

WILHELM STOECKICHT, OF MUNICH-SOLLN, GERMANY.

CHANGE-SPEED FRICTION GEARING.

Application filed April 28, 1924, Serial No. 709,517, and in Germany February 2, 1924.

My invention relates to a change-speed friction-gearing in which the transmission of the power from the driving shaft to the driven one is effected by means of friction surfaces and of an axially or laterally shiftable thrust-ring embracing one of the friction bodies and consisting of a material which is not deformed by the forces acting while the transmission of the power takes place. Said ring is, therefore, made, preferably, of a high-grade material, and those of its surfaces which contact with the friction members and transmit the power from one shaft to the other are, in conformity with the invention, so shaped that said friction members and said ring contact with each other, as far as possible, in a point or on a line, that is to say, on very small surfaces. For this purpose the inner and the outer surface of the thrust-ring which are those contacting with the friction-members are so shaped as to be curved or be very narrow so that the theoretically desired point contact is practically obtained, although it must, in fact, be a contact between flat surfaces. It is suited to the purpose to subdivide either the outer or the inner contact-surface of the thrust-ring, or both contact-surfaces thereof, in such a manner that the contact between a subdivided friction surface of the ring and a corresponding friction surface of a friction body takes place simultaneously at several places. The curved shape renders it possible to allow the thrust-ring to assume a certain slight oblique position, as well as to rotate around an axis extending through the points of contact. By subdividing one or all thrust-surfaces there is attained the result that the forces passing through the ring balance each other, and in consequence whereof a rigid guide for the ring can be dispensed with. By the oblique position of the ring which takes place during the rotation a shifting of the ring sets in since it is shifted automatically until its plane of rotation stands again vertically with respect to the axis surrounded by it, that is to say, the plane of rotation of the ring lies then parallel to the planes of rotation of the surface points of the conical friction bodies.

My invention is illustrated diagrammatically by way of example in the accompanying drawing in which Figure 1 is a side-view of a change-speed friction gearing composed of two parallel shafts with known friction cones, and of a thrust ring devised and arranged according to this invention; Figure 2 is a plan of the arrangement and combination of parts illustrated in Figure 1, and Figure 3 is a radial section through a part of the thrust-ring, drawn to an enlarged scale.

As illustrated in the sectional view, Figure 1, the inner contact surface of the thrust-ring $c$ is so subdivided that it contacts at two points, projections or places 2 and 3 with the friction surface which it surrounds whereas its outer peripheral surface 1 which contacts with the surface of the other friction member is slightly curved, so that it contacts only at one point or projection with that friction member.

The transmission of the power takes place at three points, namely, relative to the outer periphery of the thrust ring, at a convex or projected surface on 1, and relative to the inner periphery, at a single point surface 3, as well as at a frusto-conical or projected surface 2.

On the drawing $a$ and $b$ are the shafts of the change-speed friction-gearing. It is immaterial whether $a$ or $b$ is the driving shaft, or the driven one respectively. $k^1$ and $k^2$ are reversely arranged cones, or conical power-transmitting members respectively, which are affixed to said shafts. $c$ is the thrust-ring by which the power is transmitted from the cone $k^1$ to the cone $k^2$, or reversely, as the case may be, and $d$, $d^1$ and $d^2$ denote a control- and guiding-device for said thrust-ring, this device consisting of a body $d$ and two parallel annuli $d^1$ and $d^2$ which enclose the thrust-ring $c$ between them. The ring $c$ is loosely held between the annuli $d^1$ and $d^2$ so that it can rotate freely between them, together with the cones $k^1$ and $k^2$. The body $d$ of the control- and guiding-device $d$, $d^1$ and $d^2$ is hinged by a pin $e$ to a threaded sleeve $f$ located on the threaded part of a rotary spindle $g$ arranged obliquely with respect to the shafts $a$ and $b$, the angle corresponding preferably to the angle made by the cones $k^1$ and $k^2$. Supposing, the spindle $g$ be rotated in such a direction that the sleeve $f$ is moved from the left to the right, then the device $d$, $d^1$ and $d^2$ will first assume an oblique position and then follow from the left to the right until its plane stands again at right angles to the axes of the cones, as before (see the positions indicated by dotted lines in Figure 1).

The manner of operation of this change-speed friction-gearing is as follows:

If in any given case the speed of an engine, a machine, a motor-car, etc. shall be changed, the spindle $g$ is rotated in the corresponding direction so that the sleeve $d$ is shifted correspondingly whereby the members $d^2$, $c$ and $d^1$ are, in the beginning, caused to assume a certain oblique position. Supposing, the sleeve has been shifted from the position I (Fig. 1) to the position $I^a$, then the members $d^2$, $c$ and $d^1$ which have been in the position $I^b$ will first assume, or, more precisely, be caused to assume, the position $II^a$ and will then assume automatically by and by the position $II^b$. The transmission of the power is not interrupted even for a second and the change of the speed proceeds absolutely free of shocks. It is, therefore, possible to change the speed without disconnecting the gearing from the engine or motor, or other source of power, that is to say, the service need not be interrupted.

I claim:

1. A change-speed friction gearing comprising a pair of cones; and a thrust ring for said cones and having a bearing surface for each cone, one bearing surface having and presenting to its respective cone a convex surface and the other bearing surface having and presenting to the other cone a frusto-conical surface and a convex surface.

2. A change-speed friction gearing comprising a pair of cones; a thrust ring encircling one of said cones and having a bearing surface for each cone, one surface comprising two projected surfaces each being independent of the other, and the opposite surface comprising a single projected surface; and means for shifting and guiding said ring on the cone.

3. A change-speed friction gearing comprising a pair of cones; a thrust ring encircling one of said cones and having a bearing surface for each cone, one bearing surface being convex and the opposite surface being partly a frusto-conical surface and partly convex; and means for shifting and guiding said ring on the cone.

4. A change-speed friction gearing comprising a pair of cones, one of which is a driving cone and the other is a driven cone; a thrust ring encircling one of said cones and provided with a bearing surface for each cone, one bearing surface being partly a frusto-conical surface and partly a projected surface and the opposite bearing surface being a projected surface; and a device for guiding said ring on the cone and for shifting the position thereof in order to change the speed of one of the cones.

5. A change-speed friction gearing comprising a pair of cones; a thrust ring associated with said cones and having a bearing surface for each cone, one bearing surface comprising partly a projected surface and partly a frusto-conical surface and the other bearing surface comprising a projected surface; and means for shifting and guiding said ring.

6. In a change-speed device for a friction gearing, a thrust ring having inner and outer bearing surfaces, the inner surface comprising partly a projected surface and a frusto-conical surface and the opposite surface comprising a projected surface.

7. In a change-speed device for a friction gearing, a thrust ring having two bearing surfaces, one surface comprising partly a projected surface and a frusto-conical surface and the other surface comprising a projected surface.

8. In a change-speed device for a friction gearing, a thrust ring having two bearing surfaces, one surface being convex and the opposite surface being partly a frusto-conical surface and partly a convex surface.

In testimony whereof I affix my signature.

WILHELM STOECKICHT.